United States Patent [19]

Ramprasad

[11] Patent Number: 5,239,098

[45] Date of Patent: Aug. 24, 1993

[54] SOLID STATE CYANOCOBALTATE COMPLEXES

[75] Inventor: Dorai Ramprasad, Allentown, Pa.

[73] Assignee: Air Products and Chemicals, Inc., Allentown, Pa.

[21] Appl. No.: 797,598

[22] Filed: Nov. 25, 1991

Related U.S. Application Data

[63] Continuation-in-part of Ser. No. 672,711, Mar. 19, 1991.

[51] Int. Cl.$^5$ .............................................. C07F 15/06
[52] U.S. Cl. ...................................... 556/140; 556/138
[58] Field of Search ................................ 556/138, 140

[56] References Cited

U.S. PATENT DOCUMENTS

| | | | |
|---|---|---|---|
| 3,980,763 | 9/1976 | Mullhaupt | 423/579 |
| 4,251,452 | 2/1981 | McAuliffe | 260/429 |
| 4,477,418 | 10/1984 | Mulhaupt et al. | 423/219 |
| 4,830,999 | 5/1989 | Drago et al. | 502/74 |

OTHER PUBLICATIONS

R. S. Drago, et al., "Entrapment of an Anionic Stable Moisture-Resistant Oxygen Carrier in Zeolite Y", J. Amer. Chem. Soc., 110, p. 304, (1988).

G. A. Kazlov et al., "Structure and Properties of the Products of Reaction Between Molecular Oxygen and by Salts of Pentacyanocaboltate (II) Anion", translated from Teobeticheokoya Experimental Khimisya, 17, (5) 686.

S. Inamura, et al., "Separation of Oxygen from Ar by [Co$^{II}$(bpy) (terpy)$^{24}$ Complexes in Zeolite Y", Longmuir 1985, 1, 326–(1985).

R. F. Taylor et al. "Characterization of a Cobalt(II) Cyanide Complex inside Zeolite That Reversibly Binds Oxygen", J. Amer. Chem. 111, 6610, (1989).

J. F. Carter, et al., "Cobalt(II) Cyanides in Aprotic Media: Effect of Varying Counterion and Solvent", Inorg. Chem., (1986), 25, 2888–2894.

S. J. Carter, "Synthesis Characterization and Reactions of New Organocyamocbaltis", Thesis, Brandeis University 1988.

J. H. Hildebrand, "The Thermal Dissocation of Barium Peroxide", J. Amer. Chem. Soc., 34, p. 246, (1912).

*Primary Examiner*—Jose G. Dees
*Assistant Examiner*—Porfirio Nazario
*Attorney, Agent, or Firm*—Mark L. Rodgers; William F. Marsh; James C. Simmons

[57] ABSTRACT

High capacity solid state cyanocobaltate complexes represented by the chemical formula:

$$Li_3[Co(CN)_5] \bullet 1.42\ DMF \bullet 0.48\ DMAC$$

where
DMF is N,N-dimethylformamide and
DMAC if N,N-dimethylacetamide
are capable of chemically binding oxygen to form novel oxygen adducts, thereby selectively removing oxygen from an oxygen-containing fluid stream. The bound oxygen may be recovered from the complexes by increasing the temperature or by reducing the partial pressure of O$_2$ above the adduct.

4 Claims, 2 Drawing Sheets

SOLID STATE CYANOCOBALTATE COMPLEXES

CROSS REFERENCE TO RELATED APPLICATION

This is a continuation-in-part of copending application Ser. No. 07/672,711 filed Mar. 18, 1991.

TECHNICAL FIELD

The present invention relates to materials which are useful for the selective separation and recovery of oxygen from air or other oxygen-containing fluid streams.

BACKGROUND OF THE INVENTION

Gas separations may be carried out by a number of methods including distillation at cryogenic temperatures, the use of permselective membranes and by processes that utilize compositions that can reversibly and selectively sorb a component of the gas mixture. For sorption-based separation of air, current commercial technologies utilize zeolite molecular sieves as $N_2$-selective adsorbents and carbon molecular sieve (CMS) materials as $O_2$-selective adsorbents. These technologies, which are usually employed for the production of enriched nitrogen or oxygen, (rather than very high purity $N_2$ or $O_2$) have several inherent limitations which restrict their competitiveness against the cryogenic and membrane separation methods.

Synthetic zeolites reversibly adsorb nitrogen in preference to oxygen. When used for instance in a pressure-swing adsorption (PSA) process for the separation of air, the zeolite bed selectively takes up the nitrogen which is recovered by de-pressurization or evacuation of the bed. The drawback in this separation method is that it is performed inefficiently by adsorbing nitrogen which is the major component of air.

The potential advantages of selective oxygen sorbents have long been recognized and there has been much research effort directed at the synthesis of suitable materials. At the present time carbon molecular sieve (CMS) kinetically oxygen selective adsorbents are used in PSA air separation processes for the production of either enriched $N_2$ or $O_2$. Several factors limit the productivity and hence the cost-effectiveness of this technology. Even the most effective current CMS sorbents have a poor working $O_2/N_2$ selectivity in the PSA process. The necessarily short cycle times of the PSA process and the limiting oxygen adsorption kinetics lead to a poor utilization of the adsorption bed.

U.S. Pat. No. 4,477,418 discloses solid state transition metal hexacyano compounds (cyanometallates) defined as $M_x[M'(CN)_6]_y$ where M=Sc, Mn, Fe, Co, Ni etc and M' is strictly Cr, Mn, Fe, Co which are selective oxygen sorbents which are taught to be useful in processes for the separation of oxygen. The hexacyanometallate solids can be microporous, containing very small voids within their structures. In certain cases, depending on the specific formula, when the voids are of molecular dimensions the compounds have been described as "molecular sieves" since only molecules that are less than a certain effective diameter are adsorbed within their structures. The experimental data presented in U.S. Pat. No. 4,477,418 show that a number of the listed hexacyanometallates exhibit $O_2$ versus $N_2$ adsorption selectivity. Selectivity is seen at short contact times but also, to a lesser extent, at apparent equilibrium conditions. Among the compositions studied there are wide variations in both the time-dependent (i.e. kinetic) and equilibrium values of the oxygen loading, $O_2/N_2$ selectivity (ratio of oxygen to nitrogen loading) and in the kinetics or oxygen adsorption. The data show an approximate inverse relationship between the rate of oxygen uptake and the $O_2/N_2$ selectivity which is consistent with a molecular sieving or size-selective physical adsorption process, one which is more favorable for entry of the smaller $O_2$ molecule.

A relatively limited number of solid state chemical $O_2$-selective sorbents are known. One of the oldest is the barium oxide/peroxide system disclosed by J. H. Hildebrand, *J. Amer. Chem. Soc.*, 34, 246 (1912), which on the basis of the reversible equilibrium: $BaO + 1/2O_2 \rightleftharpoons BaO_2$ at about 600° C. was once used in an industrial process for the separation of air. U.S. Pat. No. 3,980,763 discloses praseodymium oxide materials which bind $O_2$, converting it to an oxide ($O^{2-}$) ion. The process is temperature/pressure reversible at about 400° C. -500° C., and is said to have the advantage over $BaO_2$ of not being deactivated by atmospheric carbon dioxide. It is taught in U.S. Pat. No. 4,251,452 that solid manganese phosphine complexes reversibly absorb oxygen, however, the number of reversible oxygen adsorption and desorption cycles that can be obtained appears to be quite limited.

Solid state compositions prepared by an entrapment or encapsulation of a metal complex within the cage of a synthetic zeolite have been shown to function as reversible oxygen sorbents. R. S. Drago, et al, *J. Amer. Chem. Soc.*, 110, 304 (1988) and U.S. Pat. No. 4,830,999 both teach entrapment of the anionic cobalt(II) cyanide (cyanocobaltate(3-)) complexes as ion-paired species: $A^+_3[Co(CN)_5]^{3-}$ or possibly $A^+_2[Co(CN)_4]^{2-}$ ($A^+$ is $Na^{30}, Cs^{30}$, etc.) within the pores of a crystalline aluminsilicate zeolite, to yield solid state $O_2$-selective sorbents. While the compounds $A^+_3[Co(CN)_5]^{3-}$ dissolved in water or polar organic solvents are well known to bind oxygen (giving either superoxo or peroxo complexes, depending on conditions), the $O_2$-binding is always considered to be irreversible (Ref. G. A. Kozlov, et al, *i Teoreticheskaya Eksperimental'naya Khimiya*, 17 (5) 686 (1984)). Thus for example, heating the superoxo complex, $[NEt_4]^+_3[O_2Co(CN)_5]^{3-}$, at 120° C. in vacuo gives only a mixture of decomposition products: $O_2$, $CO_2$, butene and other hydrocarbons. The observed reversible binding of $O_2$ by the same monomeric anionic complex in the zeolite, as described in U.S. Pat. No. 4,830,999, is attributed to as yet uncharacterized interactions between the complex and the walls of the zeolite cavity in which it resides. These interactions significantly change the nature (effectively alter the composition) of the complex such that it becomes reversibly $O_2$-binding.

While the entrapment of oxygen-carrier complexes in zeolites affords $O_2$-selective solid sorbents, there are significant disadvantages in this technique. Because of the need to incorporate (usually by ion-exchange methods) $Co^{2+}$ ions as well as the accompanying organic ligands (e.g. SALEN, $CN^-$, etc.) in zeolite cages of fixed and usuallly very small dimensions, and also at the same time retain a certain degree of "openness" within the structure for facile accessibility by $O_2$, the practical loading level of the active $O_2$-binding Co(II) species is often quite small. Thus, as taught by S. Imamura, et al, *Langmuir*, 1, 326 (1985), in $[Co^{II}(BPY)(TERPY)]$-LiY, cobalt complex in LiY zeolite composition, the concentration of $Co^{II}$ active centers is only $1.05 \times 10^{-2}$ mmole/g of zeolite (giving a capacity of about 0.022 cc $O_2/g$). In the case of the $Co(CN)_5{}^{3-}/Co(CN)_4{}^{2-}$ in zeolite Y sorbent, although a relatively high concentration of $Co^{+2}$ (up to 7.1 wt. % or 1.2 mmoles/g) can be incorporated, by spectroscopic measurements less than 1% of this cobalt is in an active $O_2$-binding configuration (Ref. R. J. Taylor, et al, *J. Amer. Chem. Soc.*, 111, 6610 (1989)). The second drawback of zeolite entrapped metal complex sorbents is their relatively high "background" adsorption capacity for $N_2$ which limits their $O_2/N_2$ selectivity in air separation applications. While the $Co(CN)_5{}^{3-}/Co(CN)_4{}^{2-}$ sorbent in zeolite Y at 40 torr pressure has a selectivity ($\alpha O_2/Ar$) of ~1.3 on the basis of data given in the above reference, the sorben's oxygen to nitrogen selectivity, (because of the high natural adsorptivity of the latter), is calculated to be less than 1; i.e., about 0.7.

The objective in the art has been to develop easily synthesized solid state metal complex oxygen carriers which have a rapid reactivity and a high reversible equilibrium capacity for oxygen and a relatively low affinity for nitrogen. Additionally, such adsorbents should retain these properties in $O_2$ recovery applications over a long period of time. Prior to the present invention, no process has been taught which employs adsorbents which meet all of the above qualifications.

S. J. Carter, et al, *Inorg. Chem.* 25, 2888-2894 (1986) disclose the synthesis of what they believed to have been $Li_3[Co(CN)_5]\bullet 3DMF$, although they were unable to purify the material produced in their synthesis reaction. This reference teaches the use of this complex for cyanation reactions, and it is specifically stated that, based upon the research presented in the article, this compound would not be the preferred choice for such reactions. No mention is made of the suitability of this or any similar compound for reversibly binding oxygen. Carter also reported similar findings in a thesis entitled "Synthesis, Characterization and Reactions of New Organocyanocobaltates" Brandeis University, 1988.

SUMMARY OF THE INVENTION

Solid state cyanocobaltate complexes represented by the chemical formula:

$Li_3[Co(CN)_5]\bullet 1.42$ DMF$\bullet 0.48$ DMAC where
DMF is N,N-dimethylformamide and
DMAC if N,N-dimethylacetamide
are capable of selectively binding (i.e., sorbing) oxygen thereby making them useful for removing oxygen from oxygen-containing fluid streams. These complexes operate by chemically reacting with oxygen to form oxygenated stable complexes which are the corresponding oxygen adducts of the above cyanocoblatate complexes.

The above described process for selectively binding or sorbing oxygen can be reversed to cause the release of the bound oxygen to regenerate the complex and recover the oxygen. This can be achieved by heating the adduct or by any means which reduces the partial pressure of $O_2$ above the adduct, such as evacuating or passing a sweep gas over the adduct.

The above cyanocobaltate complexes are advantageous over prior art oxygen sorption materials in that the present solid state materials rapidly sorb oxygen, and even at equilibrum have a high capacity and selectivity for oxygen over nitrogen and other gases. This is due in part to the fact that these cyanocobaltate complexes have a reversible chemical affinity for oxygen, rather than relying primarily on their physical characteristics for adsorbing oxygen as is the case with zeolites and carbon molecular sieves. This chemical binding reduces or eliminates problems encountered in prior processes relating to kinetically dependent adsorption and poor adsorption at or near equilibrium conditions. An additional advantage in using the present complexes is that they can be used in a non-aluminosilicate environment (i.e., they do not have to be encapsulated in the cage of a zeolite) to reversibly bind oxygen.

BRIEF DESCRIPTION OF THE DRAWING

The graph

The graph

DETAILED DESCRIPTION OF THE INVENTION

Figure 1:
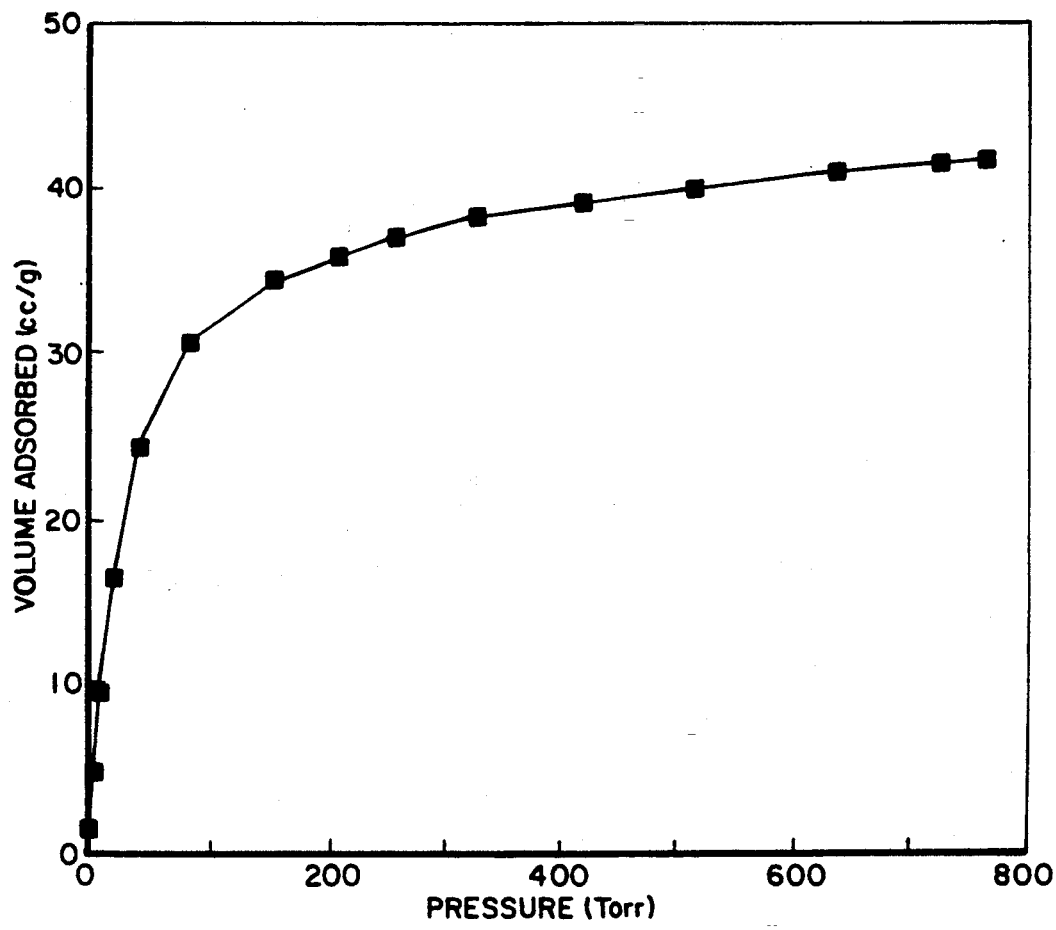
FIG. 1 shows the $O_2$ adsorption isotherm at 25° C. for $Li_3[Co(CN)_5]\bullet 1.42$ DMF$\bullet 0.48$ DMAC.

We have found that certain solid state cyanocobaltate complexes chemically react with oxygen to selectively sorb the gas the thus permit its separation and recovery from air or other fluid mixtures. The complexes are solid state materials wherein the active reversibly $O_2$-binding species are anionic, pentacyano- complexes of cobalt. To bind oxygen, an oxygen-containing fluid stream is simply brought into contact with the solid state complexes, such as in typical temperature or pressure swing adsorption processes, although the present complexes can be used in any separation process designed for separating and/or scavenging oxygen, even in tract amounts, from a gas stream or from a liquid in which oxygen has been dissolved. Specific applications for these complexes include the separation of oxygen from gas streams containing oxygen and nitrogen, such as air, and for the separation of trace amounts of oxygen from a stream comprising predominently argon. The use of these complexes is advantageous over prior art separation materials in that the present materials are solid state complexes which reversibly bind oxygen, thereby allowing the sorbed oxygen to be recovered, and the sorbent (complex) to be regenerated by heating or by reducing the $O_2$ partial pressure over the adduct.

The oxygen-reactive sorbents of the present invention are cyanometallates of cobalt(II) which contain five cyanide ligands around the cobalt central metal atom ions, and which can be represented by the chemical formula:

$Li_3[Co(CN)_5]\bullet 1.42$ DMF$\bullet 0.48$ DMAC where
DMF is N,N-dimethylformamide and
DMAC if N,N-dimethylacetamide.

In the above structural formula, cyanide is ligated to cobalt, which is in a divalent state, through carbon and the ligands DMF and DMAC are coordinated to the lithium ion. It should be noted that the ratio of the DMF and DMAC ligands in the above formula was consistent for elemental analyses of several samples prepared independently according to the procedures set out below. Other analysis techniques may indicate slightly different values for the ligands and the above chemical formula is intended to encompass such analytical variations in the relative ligand concentrations.

Where appropriate, the above ligands may be halogenated, in particular fluorinated, for greater stability towards oxidation. While it is required that the ligands e bound to the complex, additional molecules corresponding to either or both of the ligands may be present as unbound solvate molecules.

These compositions are generally prepared by reacting a cobalt(II) halide or pseudohalide with a lithium cyanide salt in a molar ratio of $1Co^{2+}$:$nCN^-$, in a polar solvent (usually corresponding to the ligand in the formula). Solids thus formed may be per se reactive towards $O_2$ or may be activated for reversible binding of $O_2$ by judicial heating or drawing a vacuum to expel a portion of the ligand, or altering the ligands by solvent replacement to achieve a composition having the above chemical formula.

These compositions act as chemical sorbents for oxygen wherein the sorbed oxygen is attached to the cobalt(II) to form the oxygen adduct of the solid-state cyanometallate complex. Chemical bonding of oxygen with these complexes to form the oxygen adducts of the respective complexes is accompanied by changes in the UV/visible spectrum of the complex, the appearance of an O-O stretching frequency ($\nu_{O-O}$) which is significantly lower than that of free gaseous (or physically adsorbed) oxygen, and also by a "blue shift" in the $\nu_{CN}$ vibration. These analytical techniques were used to determined that, unlike the prior art hexacyanometallates, the compositions used in the present process chemically and reversibly bind oxygen. Without being bound by theory, it is believed that the ability of the complexes used in the present process to reversibly bind oxygen is made possible by reducing the electron density on cobalt through the use of the countercation $Li^+$ which is able to interact with the nitrogen of the cyanide ligand to form $Co^{II}$-CN-$Li$-+-NC-$Co^{II}$ linkages. The effect is moderated by the use of coordinating ligands DMF AND DMAC, which by binding to the cation $Li^+$ can weaken the —CN—$Li^+$ interaction. By thus controlling the electron density on cobalt not only is the binding of $O_2$ onto the $[Co^{II}(CN)_n]^{3-}$ unit rendered reversible, but its affinity for oxygen (i.e. the equilibrium binding constant for $O_2$) may be predictably altered.

These metal complex selective $O_2$-sorbent compositions are especially suitable for use in both pressure swing absorption (PSA) and temperature swing absorption (TSA) processes for the separation of air to recover oxygen or nitrogen or both.

In the pressure swing method, air (preferably dry) at ambient temperature and at pressures ranging from 1 to about 10 atm is passed through a column containing a fixed bed that is packed with the above cyanocobaltate solid absorbents. Oxygen is selectively absorbed by the packed bed resulting in an effluent of nearly pure nitrogen. The absorbent may take up as much as 2.3 mmoles of $O_2$ per gram. At the end of this absorption step the resulting oxygenated solid in the bed has to be regenerated. This may be done by lowering the pressure of the atmosphere above the absorbent bed to about ambient conditions or by partially evacuating it to subambient pressures as low as 0.1 atm. Alternatively, the desorption may be achieved by depressurizing the bed followed by purging it with some of the product nitrogen. The PSA methods described here may e used for the large scale production of oxygen or nitrogen from air, but are also useful for the removal of residual low levels of oxygen from nitrogen, argon and other gases that are inert to the cyanocobaltate absorbents.

In the temperature-swing method an oxygen-containing gas mixture, preferably a dry mixture, at from about 1 to 10 atm is passed through the absorbent column which results, as above, in a selective absorption of oxygen. In this case however, the regeneration of the absorbent is accomplished by heating. The desorption of $O_2$ may be assisted by also reducing the effective partial pressure of $O_2$ in the atmosphere above the absorbent by depressurization, partial evacuation to 0.1 to 0.3 atm, or by sweeping the bed with a pre-heated stream of some of the inert gas product. The latter is essentially a combined PSA/TSA process. Specific examples of PSA and TSA processes (though not with equilibrium $O_2$-selective sorbents) have been well described in the art.

In all of these processes the cyanocobaltate complexes are in the solid state and can be used in various forms such as powders, as single crystals, as pellets, in an inert liquid to form a slurry, or any other suitable form for the particular application such as being positioned on a carrier.

The following examples are presented to better illustrate the present invention and are not meant to be limiting.

EXPERIMENTAL

In the following Examples all chemical synthesis and oxygen sorbent handling operations were done (unless otherwise indicated) under cover of nitrogen or argon using standard Schlenk line, high vacuum line, or inert atmosphere dry box techniques. Reaction solvents were carefully dried and purified by distillation from $CaH_2$ (N,N-dimethylformamide, (DMF)), or from sodium benzophenone ketyl (diethyl-ether). Thermogravimetric (TGA) analysis experiments were carried out using Perkin Elmer TG52 and DuPont 2950 instruments, which were equipped for performing measurements in either an $N_2$ or $O_2$ atmosphere. Infrared spectra were taken using a Nicolet 510 or a Perkin-Elmer 6000 seried FTIR spectrometer; the reported vibrational frequencies are considered to be acurate to within $\pm 2 cm^{-1}$.

Example 1: Synthesis and Reversible $O_2$ Absorbing Properties of $Li_3[Co(CN)_5]\bullet 1.42DMF\bullet 0.48DMAC$ Anhydrous cobalt chloride (0.24 g, 1.92 mmole) dissolved in ~25 ml of N,N-dimethylacetamide was added to ~21 ml of 0.5M LiCN (Aldrich) in DMF. The yellow solution was allowed to stand overnight giving a green very finely crystalline product. This was filtered, washed with 2×20 ml of ether and dried overnight in vacuum at room temperature. A small sample was loaded on a TGA analyzer and heated at 5° C./min to 160° C. under 100 cc/min $N_2$ and kept at 160° C. for 20 minutes. An overall weight loss of 31.2% was seen. Elemental analyses on a larger (ca 1 g) sample prepared and pyrolyzed in the same way were consistent with the formula: $Li_3[Co(CN)_5]\bullet 1.42DMF\bullet 0.48DMAC$.

Calcd (%): C, 37.76; H, 6.01; N, 27.19; Li, 5.85; Co, 16.58

Found (%): C, 37.59; H, 6.02; N, 27.09; Li, 5.81; Co, 16.51

A sample of $Li_3[Co(CN)_5]\bullet 1.42DMF\bullet 0.48DMAC$ prepared in situ in a TGA analyzer as described above was studied gravimetrically for reactivity with $O_2$. Upon introduction of $O_2$ at 25° C. a weight gain corresponding to an absorption of 1.5 mmol $O_2$/g was observed in 5 minutes indicating formation of the corresponding oxygen adduct. This $O_2$ was desorbed by flushing with $N_2$ for 20 minutes. The $O_2$ absorption isotherm for this complex is depicted in the graph of FIG. 1.

Volumetric $O_2$ absorption measurements on a sample showed an overall uptake of ~40 cc $O_2$/g (1.78 mmoles $O_2$/g) at one atm of $O_2$ in comparison to ~55 cc $O_2$/g (2.45 mmoles $O_2$/g) for $Li_3[Co(CN)_5]\bullet 2DMF$.

Example 2 (COMPARATIVE): Preparation and Reactivity of $Li_3[Co(CN)_5]\bullet 3.5DMF$ $CoCl_2$ and LiCN in a 1:5.2 molar ratio were reacted in DMF solution at room temperature resulting in the precipitation of light green powder. This was filtered with copious quantities of ether and allowed to dry by pumping in vacuum at 25° C. for 2 days. The light green powder product was found by elemental analyses to correspond to the formula, $Li_3[Co(CN)_5]\bullet 3.5DMF$.

A sample of the compound (54.50 mg) was transferred under $N_2$ to the weighing pan of DuPont 2950 thermogravimetric analyzer. With the introduction of $O_2$ a very slow uptake of 0.877 wt. % (0.27 mmoles $O_2$ per gram) was observed over a period of ten minutes indicating the formation of the corresponding oxygen adduct of the compound. On flushing with $N_2$ for 25 minutes a slow $O_2$ desorption of 0.486 wt. % (0.15 mmoles $O_2$/gram) was observed.

Example 3 (COMPARATIVE): Thermolysis of 1A and Preparation of $Li_3[Co(CN)_5]\bullet \sim 2DMF$ $Li_3[Co(CN)_5]\bullet 5DMF$ prepared in accordance with the procedures set out in copending application Ser. No. 07/672,711 was loaded on the pan of a Perkin Elmer TGA with a minimal exposure to air. It was heated under a purge of $N_2$ (100 cc/min) at a rate of 5° C./min to 160° C., and then kept at this temperature for twenty minutes. At ~100° C. a weight loss of 12.4% was observed corresponding to the loss of the "fifth" loosely adsorbed DMF. Between 130° C. and 160° C. a further 24.81% loss was seen which corresponds to the removal of approximately 2 (more tightly held) DMF molecules. This results in a material of composition $Li_3[Co(CN)_5]\bullet \sim 2DMF$. This composition was confirmed by elemental analyses.

Calcd (%) for $Li_3[Co(CN)_5]\bullet 1.8DMF$: C, 36.56; H, 3.69; N, 27.89; Li, 6.40; Co, 17.26

Found (%): C, 36.19; H, 3.36; N, 27.43; Li, 6.19.

Figure 2:
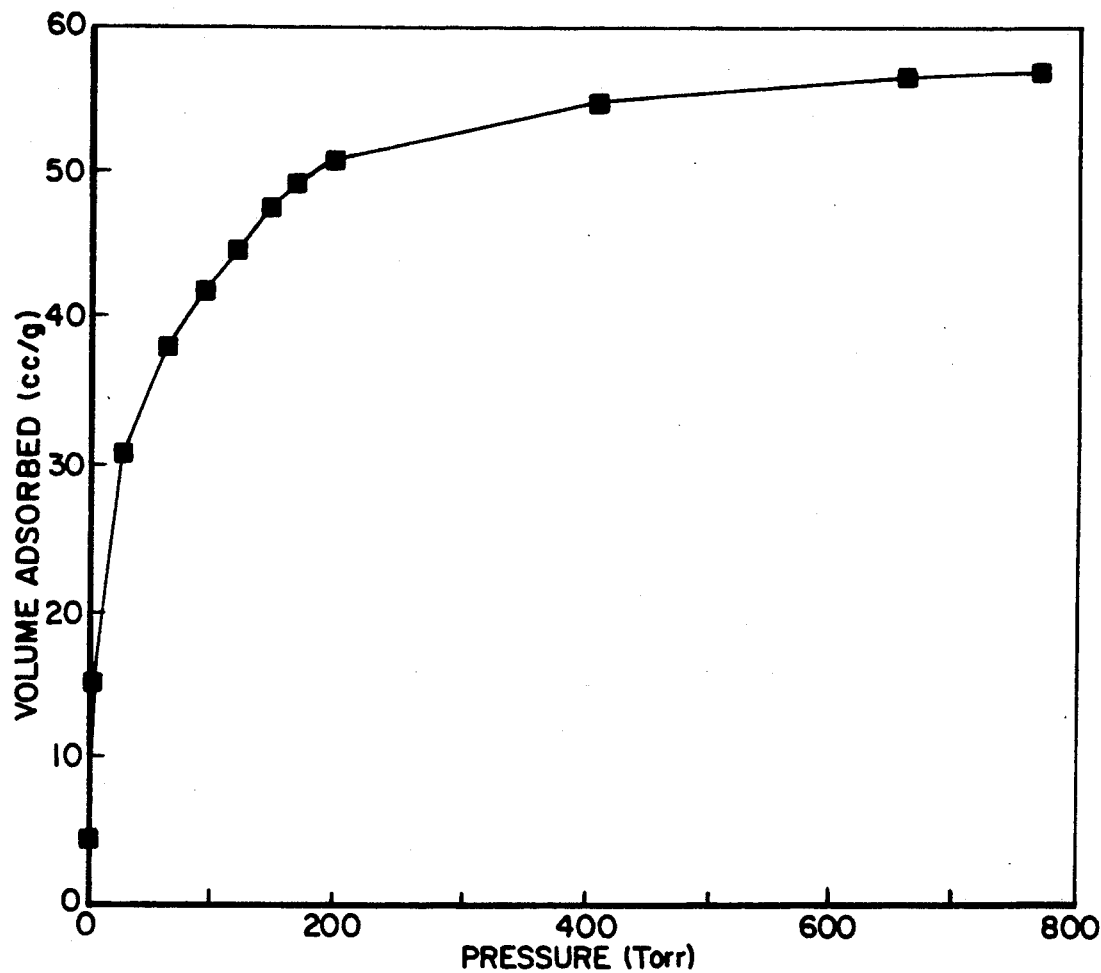
FIG. 2 shows the $O_2$ adsorption isotherm at 25° C. for $Li_3[Co(CN)_5]\bullet \sim 2.5$ DMF

On contacting a sample of this compound contained in a TGA balance pan at 30° C. with oxygen the sample changed color from a pale green to red as it absorbed up to ca 5.0% by weight (1.5 mmoles/g) of oxygen within five minutes to form the corresponding oxygen adduct. When the oxygen over the sample was replaced with a flow of $N_2$ the sample desorbed 1.2 mmoles/g of $O_2$ within 15 minutes. The absorption isotherm for this complex is depicted in the graph of FIG. 2. A comparison of this isotherm with that of $Li_3[Co(CN)_5]\bullet 1.42DMF\bullet 0.48DMAC$ shown in FIG. 1 clearly shows that the slope of the isotherm for $Li_3[Co(CN)_5]\bullet 1.42DMF\bullet 0.48DMAC$ is not steep as that for $Li_3[Co(CN)_5]\bullet \sim 2DMF$ indicating that $Li_3[Co(CN)_5]\bullet 1.42DMF\bullet 0.48DMAC$ is more suitable for bulk air separations.

Example 4 (COMPARATIVE): Synthesis of $Li_3[Co(CN)_5]\bullet \sim 3.5DMAC$ (DMAC = N,N-dimethylacetamide)

Anhydrous cobalt chloride (0.25 g, 1.92 mmole) was dissolved in ~15 ml of DMAC (Aldrich). In another vessel, solid $LiCN\bullet 1.5THF$ (1.38 g, 9.79 mmoles) (see comments about this reagent in Example 6)) was dissolved in 70 ml of DMAC with warming. Undissolved solids (considered to be impurities) were removed by filtration. The cobalt chloride solution was added to the LiCN-containing filtrate with vigorous stirring giving a green solution. After one hour a green precipitate appeared. This was filtered, washed with 2×40 ml of dry diethylether and dried in vacuum resulting in a yellow green powdered product (1.05 g, 1.97 mmole of 4)

Elemental analyses:

Calcd (%) for $Li_3[Co(CN)_5]\bullet 3.5DMAC$: C, 44.3; H, 6.12; N, 23.12; Co, 11.45; Li, 4.04

Found (%): C, 43.27; H, 6.21; N, 20.90; Co, 11.02; Li, 3.04

Infrared: Nujol mull, cyanide band at 2099 cm$^{-1}$.

A sample of $Li_3[Co(CN)_5]\bullet 3.5DMAC$ synthesized above was loaded on a DuPont 2950 TGA analyzer without exposure to air. Upon introduction of $O_2$ at 30° C. a weight increase of 2.64% (0.82 mmoles $O_2$/g) was observed over ½ hour indicating formation of $Li_3[Co(CN)_5]\bullet 3.5DMAC$. The $O_2$ was desorbed by flushing with $N_2$ for ~8 hours. Reintroduction of $O_2$ at 30° C. led to an identical absorption of the gas over a similar time period.

A sample of $Li_3[Co(CN)_5]\bullet \sim 3.5DMAC$ from above was loaded on a Perkin Elmer TGA with a minimal exposure to air. On heating at 2° C./min to 110° C. and cooling a weight loss of 13.36% was observed [~0.8DMAC]. Introduction of $O_2$ at 30° C. turned the yellow green sample to orange and a weight gain of 1.44%(0.45 mmole/g) was observed over 15 minutes. Heating to 90° C. turned the orange sample back to yellow-green and a weight loss of 2.8% was seen. Thus in addition to the $O_2$ desorption, heating also results in the removal of some solvent. Reintroduction of $O_2$ in a second cycle showed a weight gain of 1.2% (0.37 mmol/g) over a period of 20 minutes. The same experiment performed on a DuPont TGA without any exposure of the sample to air resulted in approximately twice the uptake over a similar time period, attesting to the high sensitivity of the sample to atmospheric moisture. The $O_2$ adduct of this complex also shows the growth of a new absorption band at 1130 cm$^{-1}$ in the infrared, which is assigned to the vibrational frequency of the bound $O_2$ molecule in $Li_3[Co(CN)_5-O_2]\bullet xDMAC$.

Example 5 (COMPARATIVE): Synthesis and Oxygen Reactivity of $Li_3[Co(CN)_5]\bullet pDMF$ where p=0

The procedure of Example 5 above was carried out with further heating the sample 1A under $N_2$ ultimately to 250° C. There was a weight decrease of 61.55% corresponding to a loss of all the DMF ligands. This resulting material was tested and did not show a weight gain when exposed to oxygen. This clearly demonstrated the importance of the presence of the ligands on the complexes used in the present process.

Having thus described the present invention, what is now deemed appropriate for Letters Patent is set out in the following appended claims.

We claim:

1. A solid state cyanocobaltate complex represented by the chemical formula:

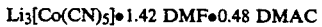

where

DMF is N,N-dimethylformamide and

DMAC if N,N-dimethylacetamide.

2. The cyanocobaltate complex of claim 1 which is in the form of a powder, pellet or crystal.

3. The cyanocobaltate complex of claim 1 which is positioned on a carrier.

4. The cyanocobaltate complex of claim 1 which is present in an inert liquid to form a slurry.

* * * * *